June 12, 1934.  I. TROLLEY  1,963,036
POTATO PLANTER
Filed April 11, 1932   2 Sheets-Sheet 1
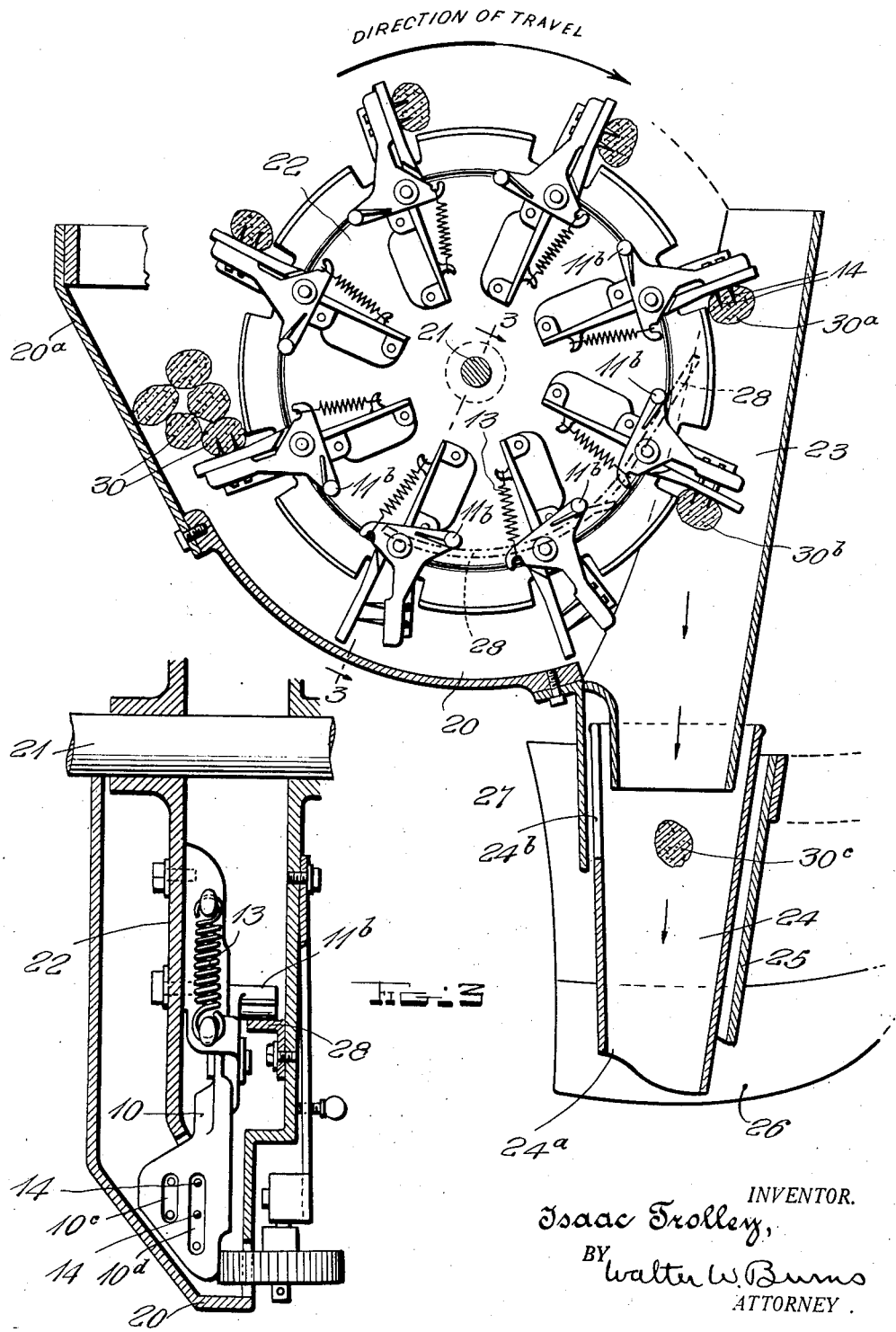
INVENTOR.
Isaac Trolley,
BY Walter W. Burns
ATTORNEY.

June 12, 1934.    I. TROLLEY    1,963,036
POTATO PLANTER
Filed April 11, 1932    2 Sheets-Sheet 2
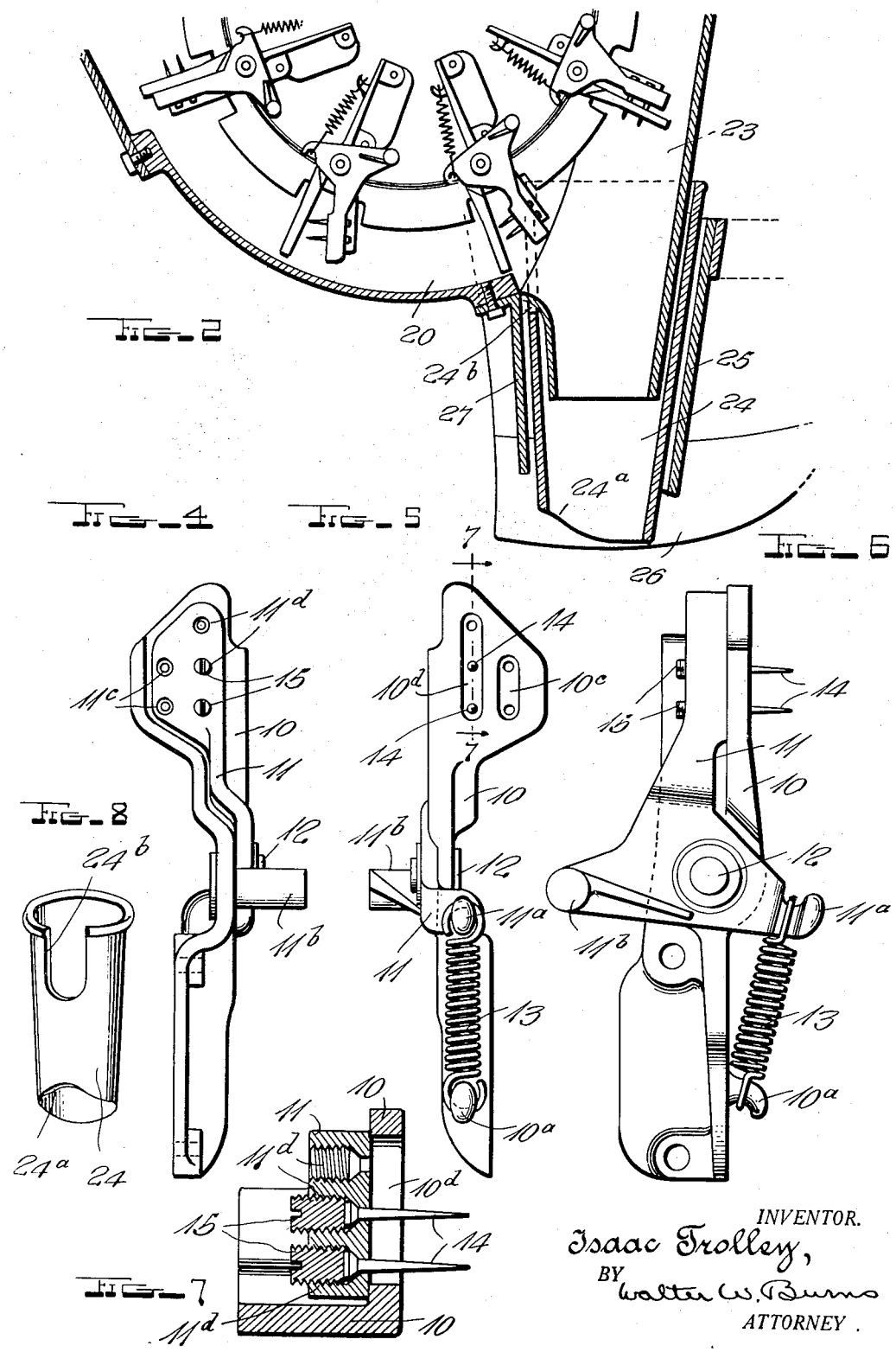
INVENTOR.
Isaac Trolley,
BY Walter W. Burns
ATTORNEY.

Patented June 12, 1934

1,963,036

UNITED STATES PATENT OFFICE 1,963,036

POTATO PLANTER

Isaac Trolley, York, Pa., assignor to Fred H. Bateman Company, York, Pa., a corporation of New Jersey Application April 11, 1932, Serial No. 604,632

6 Claims. (Cl. 221—135)

This invention relates to potato planters and particularly to that type in which the dropping mechanism is unattended.

Potato planters are of two general types. In one type, the planter is attended by a man or boy who usually rides on the rear of the planter and watches the planting operation to see that the planter drops a seed potato at each proper time. The other type, called the automatic type, has no attendant and depends entirely upon its mechanism to function properly. In this type it is very necessary that the mechanism pick up a seed and drop it at the proper time; otherwise there will be unplanted hills. If there are many of these unplanted hills the yield per acre is seriously affected.

In addition to the necessity of being sure that there is a potato seed at each proper interval, it has been found that it is also very necessary to have the length of the interval constant throughout the row. When this result is not obtained, it has been found by experience that adjacent seeds fall too close together and, due to lack of nourishment, produce many less potatoes per acre than when properly planted at uniform intervals.

The primary object of this invention is the provision of an improved potato planter.

Other objects of the invention are the provision of an improved planter wherein the planter will, (1) always pick up a seed, (2) retain it on the pick until near the ground, (3) deliver it with no mechanical obstruction after release, (4) place the seeds at regular intervals.

Other and further objects of the invention will be apparent to those skilled in the art from a reading of the complete specification and claims.

Referring to the drawings wherein I have illustrated an embodiment of my invention.

Figure 1 is a diagrammatic illustration of the pickers and delivery tube of my planter with the parts in operative or planting position.

Figure 2 is a diagrammatic illustration of a portion of the planter showing the boot, shoe and delivery tube in raised or transport position.

Figure 3 is a cross section on the line 2—2 of Figure 1.

Figures 4 to 7 inclusive are detail views of the pickers which pick up the seed potatoes and deliver them to the delivery tube.

Fig. 8 is a perspective view of the delivery tube.

I will now describe the improved picker which is an important feature of my improved planter.

Referring particularly to Figures 4 to 7 inclusive, 10 designates the main body of the picker, 11 the pick arm. The pick arm 11 is pivoted to the main body portion by the pivot 12. The outer end of the arm 10 and the outer end of the main body portion 11 are normally held together by the spring 13 which is secured at its ends to the hook $10^a$ and the hook $11^a$. A cam engaging portion of the arm 11 is shown as an extension or arm $11^b$ which engages a cam member to be described.

The outer end of the main body member 10 is provided with openings as the slots $10^c$, $10^d$. The slot $10^c$ as illustrated is shorter than the slot $10^d$. In the outer end of the pick arm 11, are two rows of openings $11^c$ and $11^d$. The row of openings $11^c$ registers with the slot $10^c$ and the row of openings $11^d$ registers with the slot $10^d$.

As shown in Figure 7, two of the openings $11^d$ in the outer end of the main body member 11 are provided with picks 14 which have heads engaging the shoulders of the openings $11^d$. Retaining screws 15 are provided to coact with the screw threads of the openings to hold the picks 14 in place.

In practice, it has been found that one or two picks give the best results in pickers for potato planters. However, with some arrangements, it may be desirable to use more than two. The picks may be of the same or different lengths in accordance with the conditions. It has been found to be very desirable to use the same picker device with different sizes of potato seed. For this reason, it has been found to be efficient to shift the positions of the picks to correspond to the size of potato seed used at a particular time. In addition, the outer end of the main body member 10 and the outer end of the pick arm 11 are both tapered almost to a point. It will be observed that the outer opening $11^d$ for receiving a pick is located almost at the tip of the tapered end—close enough thereto to provide for the holding of a pick to impale the smallest potato seed that would be used. The picks are adjusted in the different openings $11^c$, $11^d$ according to the size of seed used. If too many picks are used on one picker, there is danger of picking up more than one seed and also of not impaling the seed to a sufficient depth to insure its being held until the releasing point is reached.

It will be clear from an inspection of Figures 5, 6 and 7 that if, when a seed is carried by the picks, the same may be removed by rotating the pick arm relatively to the main body portion through which the picks extend. This action is performed by the cam means to be described and withdraws the picks, at the proper time, from the potato seed and permits it to fall to the ground.

Referring particularly to Figures 1, 2 and 3, 20 designates the bottom of the pick-up chamber where the seeds are picked up by the pickers. 21 designates the axis about which the pickers revolve, being secured to a head 22 indicated in dotted lines. The direction of rotation is clockwise as shown in Figure 1 and as indicated by the direction arrow. At the forward side of the revolving head 22 is a guard 23 which is open at its rear to receive the picker devices as they carry the seeds up over and forward, dropping them as they reach the desired place. The guard 23 has an open lower end which permits easy passage of the potato seed to a delivery tube 24. This delivery tube 24 is provided with a cutaway lower rear edge 24$^a$ which permits of the passage of the potato seed after the same has been dropped on the ground, and without dislodging it from its place where dropped.

The delivery tube 24 is provided at its upper rear edge with a cut away portion 24$^b$ of sufficient width to permit entrance of the lower portions of the walls of the pick-up chamber 20. This cut away portion 24$^b$ is to permit the raising of the delivery tube when the boot and shoe are raised to transport position.

Around the forward portion of the delivery tube is the boot 25 which is substantially of U-shape horizontal cross section. The boot 25 is secured to the shoe 26 which latter is connected to the frame in any suitable or well-known manner. Suitable lifting means are provided to raise and lower the boot, shoe and delivery tube.

The delivery tube is suitably secured in the top of the boot. At its rear, secured to the bottom of the pick-up chamber 20 is a plate 27 which serves to close the cut away portion 24$^b$ of the delivery tube 24 when the latter is in its lowered or operative position.

On the side wall of the pick-up chamber 20 is located a cam 28 which serves to operate the extension 11$^b$ of the pick arm 11. This cam is so shaped that its operation extends only during about one fourth of the revolution. Instead of operating twice—once to discharge the seed and once to pick up a new seed, the cam 28, operates once just after the picker has entered the lower half of its revolution to discharge the seed and is held in this position until it has passed the lower center and has started upward. Then the picker is in contact with the seed of the pick-up chamber 20. At this point, the arm 11 is released with the result that a new seed is impaled. This new seed is carried up, over and downward to the discharge point.

It is to be noted that the discharge operation takes place after the picker leading any other picker has passed out of the way. By this construction and the construction of the guard 23, delivery tube 24, boot 25 and shoe 26, it will be noted that the seed is not separated from the picks until it has not only a very direct route to its place of planting, but also the shortest route.

By having the delivery tube within the boot, any tendency for the seed to strike the ground and either bounce or roll to an improper place, is prevented.

It is desired that the coaction of the different parts of this structure be noted. First, the picks 14 are adjusted in the openings 11$^c$, 11$^d$, so that the correct positions of the picks will be had for the particular size of seed being used.

It is to be noted that not only are the seeds discharged at a time when they are near the ground as possible and when they have a clear path but also they are released in the plane of revolution of the pickers and their head 22.

The delivery tube is tapered from its top downwardly which also tends to make the seed have a regular planting interval.

I have designated the positions of the seed by the reference character 30 as it it is being picked up, 30$^a$ just before it reaches the point where the picks begin to be withdrawn, 30$^b$ where the picks are beginning to be withdrawn and 30$^c$ where the seed is on the way to its planted position.

These features all cooperate to bring about not only regular planting but positive planting. The picks insure the automatic and practically 100% sure pick-up while the type of discharge and guide means for the seed after discharge insure the deposit of the seed at a regular distance apart. This feature gives larger crops due to the proper utilization of the whole volume of earth of the row.

While I have illustrated and described in detail embodiments of the features of my invention, I desire to have it understood that I do not limit myself to the exact structures illustrated and that modifications and changes may be made without departing from the spirit of my invention and within the scope of the appended claims.

Having described my invention what I claim and desire to secure by Letters Patent is:—

1. In a potato planter, a picker comprising a main body member, means for securing the body member to the planter, a pick arm pivoted relatively to the body member, a pick on the pick arm adjacent its outer end and means for holding the pick in any one of a plurality of lateral positions on the arm to provide for different sizes of potato seeds.

2. In a potato planter, a picker comprising a main body member, means for securing the body member to the planter, a pick arm pivoted relatively to the body member, the pick arm having a plurality of openings arranged relatively laterally to each other and means for holding a pick for lateral adjustment in any one of the said openings.

3. In a potato planter, a picker comprising a main body portion having an outer end tapered substantially to a point, a pick arm pivoted relatively to the body member and movable in the plane of movement of the body member and relatively thereto, the pick arm being provided with openings to receive one or more picks, the openings being arranged in a spaced relation sidewise and radially, one of the openings being substantially at the tapered point of the pick arm to pick up small potato seeds.

4. In a potato planter, a picker comprising a main body member having means for securing the same on the planter, a pick arm fulcrumed on the body member and having its outer end registering with a portion of the body member, a group of picks in selected openings on the end of the pick arm and holding means for securing members of the pick group in any one of a plurality of adjustments radially and in any one of a plurality of adjustments laterally to provide for different sizes of potato seeds.

5. In a potato planter, a picker comprising a main body member, means for securing the body member to the planter, a pick arm fulcrumed on the body member and having its outer end registering with a portion of the body member, openings in the end of the pick arm to receive one or more picks, said openings being arranged radially and laterally to provide radial and lateral adjustment of the pick or picks for different sizes of seeds and means for holding two picks in a radial relation to each other and the axis of rotation of the arm, or in a relative side relation to each other.

6. In a potato planter, a picker comprising a main body member having parallel slots at its outer end, means for securing the body member to the planter, a pick arm fulcrumed on the body member and having a pick in the outer end in position to register with any one of the slots of the main body member, means for holding the pick in one of a plurality of adjusted positions in the same or a different slot.

ISAAC TROLLEY.